United States Patent [19]
Candau et al.

[11] Patent Number: 5,171,782
[45] Date of Patent: Dec. 15, 1992

[54] INVERT MICROLATICES USEFUL AS FLOTATION AND DRAINAGE ADDITIVES AND FOR ABSORPTION AND RETENTION OF AQUEOUS FLUIDS

[75] Inventors: Francoise Candau, Strasbourg; Pascale Buchert, Haguenau, both of France

[73] Assignee: Norsolor, Paris, France

[21] Appl. No.: 477,813

[22] PCT Filed: Jun. 17, 1988

[86] PCT No.: PCT/FR88/00321
§ 371 Date: Sep. 14, 1990
§ 102(e) Date: Sep. 14, 1990

[87] PCT Pub. No.: WO88/10274
PCT Pub. Date: Dec. 29, 1988

[30] Foreign Application Priority Data

Jun. 25, 1987 [FR] France ................ 87 08925

[51] Int. Cl.$^5$ .............................................. C08F 2/32
[52] U.S. Cl. .................................. 524/801; 524/827; 524/829; 524/831
[58] Field of Search ............... 524/801, 827, 829, 837, 524/458, 460

[56] References Cited

U.S. PATENT DOCUMENTS 4,521,317 6/1985 Candau et al. ................. 252/8.55
4,681,912 7/1987 Durand et al. ................. 524/827

FOREIGN PATENT DOCUMENTS 2161492 1/1986 United Kingdom .

Primary Examiner—Joseph L. Schofer
Assistant Examiner—Jeffrey T. Smith
Attorney, Agent, or Firm—Millen, White, Zelano and Branigan

[57] ABSTRACT

An invert microlatex of at least one cationic water-soluble vinyl monomer, if necessary copolymerized with at least one anionic or non-anionic water-soluble vinyl monomer, is prepared by a process consisting in a first stage (a) of preparation of an invert microemulsion (of the water-in-oil type) and a second stage (b) in which the invert microemulsion obtained in stage (a) is subjected to conditions of polymerization, stage (a) consisting in mixing: (A) an aqueous solution of at least one cationic water-soluble vinyl monomer, if necessary mixed with at least one anionic or non-ionic water-soluble vinyl monomer, (B) an oil phase containing at least one liquid hydrocarbon, and (C) at least one non-ionic surface active agent, in a proportion sufficient to obtain an invert microemulsion, and having an HLB, either between 11 and 15 when the cationic water-soluble vinyl monomer is alone or mixed with an anionic water-soluble vinyl monomer, or between 7.5 and 13 when the cationic water-soluble vinyl monomer is mixed with a non-ionic water-soluble vinyl monomer. Application as a flotation and drainage additive, and as an absorber and retainer of water.

17 Claims, No Drawings

INVERT MICROLATICES USEFUL AS FLOTATION AND DRAINAGE ADDITIVES AND FOR ABSORPTION AND RETENTION OF AQUEOUS FLUIDS

BACKGROUND OF THE INVENTION

The synthesis of water-soluble polymers and copolymers (polyacrylamide, acrylic acid-acrylamide copolymer, etc ...) is now the object of much research works. The mode of preparation used is generally invert emulsion polymerization. The final product is then in the form of a polymeric colloidal suspension dispersed in an oil, called an invert latex. This process makes possible a quick dissolution of the polymer in water, without formation of gels or aggregates as is the case when the product is packaged in powder form. It further facilitates storage and handling. However, a major drawback of the invert latices is their lack of stability which is reflected by a significant separation over time as well as by a wide size distribution of the particles.

This invention relates to a process of preparation of microlatices dispersed in a continuous oil phase by polymerization (or copolymerization) in a microemulsion of the water-in-oil type of at least one water-soluble vinyl monomer and the use of these invert microlatices in the absorption and the retention of aqueous fluids. In this process, the water-soluble monomer (or the mixture of monomers) is dissolved in water and dispersed in a mixture of surfactant and oil so that the proportions of components correspond to the monophase regions, also called microemulsions, of the monomer surfactant/oil-/aqueous solution phase diagram. The monomer is trapped inside water-swollen micelles or else in the aqueous regions of a microemulsion of bicontinuous structure. These systems are optically transparent, thermodynamically stable and consequently lend themselves in particular to photochemical reactions. Such a process, known in particular by the teaching of patent FR-A-2,524,895, has been applied in particular to acrylamide, acrylic acid and N-vinylpyrrolidone. In this case, the water-soluble monomer is photochemically or thermally polymerized in microemulsion. The method consists in initiating the polymerization photochemically, for example, by ultraviolet irradiation, or thermally with an initiator that is hydrophobic, for example, azobisisobutyronitrile, or hydrophilic, for example, potassium persulfate.

The polymerization is photochemically performed very quickly, for example, in several minutes, quantitatively, and leads to the formation of microlatex whose particle radius is on the order of 15 nm. The surfactant used preferably is part of the class of anionic surfactants (such as sodium di-2-ethyl hexylsulfosuccinate) or of that of cationic surfactants (such as hexadecyl benzene-ammonium dimethyl bromide). It is also known by patent FR-A-2,565,592 to use, for the copolymerization of at least two acrylic monomers (for example (meth)acrylic acid and its alkaline salts), nonionic surfactants whose HLB (hydrophilelipophile balance) is from 8 to 11.

It is important to note that the two above-mentioned documents are concerned exclusively with the (co)-polymerization of nonionic monomers (acrylamide, N-vinylpyrrolidone) or anionic monomers ((meth)acrylic acid and its alkaline salts) and that they do not indicate in any way that the processes of preparation of invert microlatices in a continuous oil phase by microemulsion polymerization of the water-in-oil type would be applicable in the case of cationic monomers. A first problem that this invention proposes to solve therefore consists in determining the conditions under which this type of process could be usefully applied in the (co)-polymerization of cationic water-soluble vinyl monomers, if necessary mixed with at least one nonionic or anionic water-soluble vinyl monomer. A second problem that this invention aims to solve consists in determining the preparation conditions under which the microlatices obtained are stable (thermodynamically) and optically transparent. Still another problem that this invention proposes to solve consists in determining the conditions under which the invert microlatices thus obtained could be used for the absorption and the retention of aqueous fluids, also as additives (flotation and drainage additives) in the production of paper pulp.

SUMMARY OF THE INVENTION

A first object of this invention consists in an invert microlatex of at least one cationic water-soluble vinyl monomer, if necessary copolymerized with at least one anionic or nonionic water-soluble vinyl monomer. Such a microlatex, which can be obtained in particular by the process described below in further detail, can have the following favorable properties and characteristics:

to be stable (thermodynamically), to be optically transparent, to exhibit a molecular weight of the polymer (average by weight) between about $2 \cdot 10^6$ and $15 \cdot 10^6$, this molecular weight being determined by scattering of light, to exhibit a polydispersity index, defined as the ratio of the average diameter by weight of the polymer particles to their average diameter in number, between about 1.05 and 1.2, to exhibit a Newtonian rheological property to dispersed phase volume fractions (water-swollen polymer) reaching about 55%, to exhibit a limit viscosity with a zero shearing gradient (determined at 25° C.) between about 3 and 500 centipoises, according to the volume fraction of the dispersed phase.

A second object of this invention consists in a process of preparation of an invert microlatex such as defined above, comprising a first stage (a) of preparation of an invert microemulsion (of the water-in-oil type) and a second stage (b) in which the invert microemulsion obtained in stage (a) is subjected to polymerization conditions, characterized in that stage (a) consists in mixing the following components:

(A) an aqueous solution of at least one cationic water-soluble vinyl monomer, if necessary mixed with at least one anionic or nonionic water-soluble vinyl monomer, (B) an oil phase comprising at least one liquid hydrocarbon, and (C) at least one nonionic surfactant, in a sufficient proportion to obtain an invert microemulsion and having an HLB:

either between about 11 and 15 when the cationic water-soluble vinyl monomer is alone or mixed with an anionic water-soluble vinyl monomer, or between about 7.5 and 13 when the cationic water-soluble vinyl monomer is mixed with a nonionic water-soluble vinyl monomer.

The concentration of the cationic water-soluble vinyl monomer in aqueous solution (A) is generally between 5 and 80% by weight, preferably between 10 and 60% by weight.

The liquid hydrocarbon present in oil phase (B) is preferably chosen from the aliphatic, linear, branched, or cyclic hydrocarbons, having 6 to 14 carbon atoms, or else from the aromatic hydrocarbons having 6 to 15 carbon atoms.

To obtain 100 parts by weight of the invert microemulsion according to the invention, preferably there are mixed:

25 to 65 parts by weight of aqueous solution (A),
25 to 60 parts by weight of oil phase (B), and
10 to 27 parts by weight of nonionic surfactant (C).

Examples of nonionic surfactants usable according to this invention in particular are polyoxyethylene sorbitol hexaoleate, sorbitan sesquioleate, ethoxyl sorbitan trioleate, sorbitan trioleate and polyoxyethylene sorbitol monooleate as well as copolymers comprising at least two polymer components derived from liposoluble complex monocarboxylic acids and another residue polymer component of a water-soluble compound containing polyoxyalkylene patterns, said copolymers being such as those described in the European patent application published under no. 0,258,120 or their mixtures.

Cationic water-soluble vinyl monomers entering into the scope of this invention are in particular unsaturated quaternary ammonium salts answering the general formula:

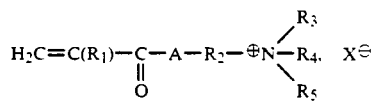

in which:

A is an oxygen atom or an NH group, $R_1$ is a hydrogen atom or a methyl radical, $R_2$ is a linear or branched alkyl radical having 2 to 4 carbon atoms, $R_3$, $R_4$ and $R_5$, identical or different, are linear or branched alkyl radicals, or aryls, and X is chosen from halogen atoms and groups $-C_2H_5-SO_4$ and $-CH_3-SO_4$.

Examples of such salts are in particular methacryloyloxyethyltrimethylammonium chloride and acryloyloxyethyltrimethylammonium chloride.

As anionic water-soluble vinyl monomers usable according to this invention, acrylic acid, methacrylic acid, 2-acrylamido-2-methylpropanesulfonic acid and particularly their alkaline salts can be cited in particular. As nonionic water-soluble vinyl monomers usable according to this invention, acrylamide, methacrylamide and N-vinylpyrrolidone can be cited in particular.

In the scope of this invention, the cationic water-soluble vinyl monomer can be mixed in all proportions with at least one water-soluble vinyl monomer which is either anionic or nonionic such as defined above. However, in such mixtures, it is preferable that the proportion of the cationic water-soluble vinyl monomer be at least equal to 5% by weight.

The proportion of the nonionic surfactant in the invert microemulsion and the choice of the HLB of this surfactant are two decisive elements for the effectiveness of the process according to the invention. On the one hand, with the exception linked to the special nature of the water-soluble vinyl monomers used or to the special nature of the oil phase, a stable (thermodynamically) invert microemulsion generally cannot be obtained when the proportion of the surfactant in the mixture of components (A), (B) and (C) is less than 10% by weight. On the other hand, the choice of the HLB of the surfactant depends on the following four factors:

polymerization of the cationic water-soluble vinyl monomer alone or else mixed with a comonomer, if the cationic monomer is mixed with a comonomer, nature (anionic or nonionic) and proportion of the latter, nature of the cationic monomer, and nature of oil phase (B).

It is further known that in this type of process the amount of surfactant required depends on the HLB of the latter and generally passes through a minimum value when the HLB increases. Since, for reasons of economic order, most often an effort is made to minimize the use of surfactant, this minimum value will also constitute an industrial optimum. It is therefore very important to determine in each case, as a function of the factors listed above, the HLB of the surfactant to be used. To illustrate this aspect of the invention, the following examples can be given: thus, when the methacryloyloxyethyltrimethylammonium chloride is polymerized alone, the oil phase consisting of cyclohexane, it is preferable to use a nonionic surfactant (or mixture) having an HLB between about 12.8 and 13.2. When the methacryloyloxyethyltrimethylammonium chloride is copolymerized with acrylamide, the oil phase consisting of cyclohexane, it is preferable to use a nonionic surfactant (or a mixture) having an HLB between about 7.5 and 13, said HLB preferably being correlated to fraction by weight x of the chloride in the mixture by the relation:

$$4x + 7.3 \leq HLB \leq 5.5x + 7.7$$

Taking into account the preceding technical teaching, the determination of the HLB of the surfactant to be used for other monomers is within the scope of one skilled in the art.

During the preparation of the invert microemulsion, it is important that the temperature of the mixture be carefully controlled, because of the sensitivity to temperature of the invert microemulsions in the presence of nonionic surfactants. This influence of the temperature is all the more sensitive as the concentration in surfactant is closer to the minimum content required to obtain an invert microemulsion. To reduce the necessary content in surfactant and to be free to the maximum of the influence of the temperature on the stability of the invert microemulsions, the latter will be prepared as far as possible at a temperature as close as possible to that which will have been chosen for the polymerization.

During second stage (b) of the process according to the invention, the invert microemulsion prepared during stage (a) is subjected to polymerization conditions which are:

photochemical, for example by ultraviolet irradiation, and/or thermal, by putting in the presence of a radical initiator that is hydrophobic (such as azobisisobutyronitrile) introduced with oil phase (B) or hydrophilic (such as potassium persulfate or ammonium) introduced with aqueous solution (A), or else in the presence of a redox system in which the persulfate is used in combination with at least one reducing agent chosen from polyhydrophenols, sodium sulfite and bisulfite, dimethylaminopropionitrile, diazomercaptans and ferricyanides.

The polymerization is performed quickly and quantitatively and leads to the formation of stable and transparent microlatices containing a high content of water-soluble (co)polymer. The polymerization time is, for example, 5 to 260 minutes photochemically at room temperature, 5 to 360 minutes thermally (the time naturally being an inverse function of the temperature). The temperature usable during a polymerization thermally is generally between about 20° and 90° C.

The microlatices according to the invention are usable in a particularly effective way as flotation and drainage additives in the production of paper pulp, this application constituting the third object of this invention.

On the other hand, it is possible, by a variant of the process according to the invention, to modify the invert microlatices obtained to impart to them absorption and water-retention properties. This modification consists in incorporating in the invert microemulsion prepared in stage (a) at least one crosslinking agent in a sufficient amount relative to the sum of monomers to be polymerized during stage (b). By a sufficient amount, a proportion preferably at least equal to 0.2% by weight and preferably at most equal to 5% by weight relative to the monomer or monomers is meant. The crosslinked invert microlatices thus obtained are usable for the absorption and the retention of aqueous fluids, in particular in the articles for hygiene and health, this also constituting another object of this invention.

As crosslinking agents usable in this variant of the process according to the invention, there can be cited:

1) compounds having at least two double polymerizable bonds and, 2) compounds having at least one double polymerizable bond and at least one functional group reactive with at least one of the monomers.

Examples of the compounds listed above in the first place, having at least two double polymerizable bonds, are:

a) di- or poly-vinyl compounds, such as, in particular, divinylbenzene, divinyltoluene, divinylxylene, divinyl ether, divinylketone and trivinylbenzene, b) di- or poly-esters of unsaturated mono- or poly-carboxylic acids with polyols, such as esters of di- or tri-(meth)acrylic acids with polyols (such as ethylene glycol, trimethylolpropane, glycerol, polyoxyethyleneglycols, polyoxypropyleneglycols, etc.), unsaturated polyesters (that can be obtained by reaction with any of the above-mentioned polyols with an unsaturated acid such as maleic acid), esters of di- or tri-(meth)acrylic acid (that can be obtained by reaction of a polyepoxide with (meth)acrylic acid), c) bis (meth)acrylamides such as N,N'-methylene-bis-acrylamide, d) carbamylic esters that can be obtained by making polyisocyanates (such as toluene diisocyanate, hexamethylene diisocyanate, 4,4'-diphenylmethanediisocyanate, etc. and prepolymers containing an NCO group obtained by making such a diisocyanate react with the compounds containing active hydrogen atoms) react with monomers containing hydroxyl groups. Such esters are in particular those of di(meth)acrylic acids that can be obtained by making the above-mentioned diisocyanates react with the hydroxyethyl (meth)acrylate, e) di- or poly-(meth)allylic ethers of polyols (such as alkylene glycols, glycerol, polyalkylene glycols, polyoxyalkylene polyols, carbon hydrates, etc.), such as diallyl ether of polyethylene glycol, allyl starch and allyl cellulose, f) di- or poly-allyl esters with polycarboxylic acids such as diallyl phtalate, diallyl adipate, etc., and g) unsaturated mono- or poly-carboxylic acid esters with mono(meth)allyl ethers of polyols, such as the ester of (meth)acrylic acid with the monoallyl ether of polyethylene glycol.

The compounds of the second above-mentioned type having at least one double polymerizable bond and at least one functional group reactive with at least one of the monomers are the ethylenically unsaturated compounds containing at least one group reactive with carboxyl, carboxyl anhydride, hydroxyl, amine or amide groups. Examples of these compounds are N-methylol(meth)acrylamide and glycidyl (meth)acrylate.

The examples below are given by way of nonlimiting illustration of this invention.

EXAMPLE 1

116 g of cyclohexane and 24 g of a mixture (having an HLB of 12.9) of polyoxyethylene sorbitan monooleate (TWEEN 80) and of sorbitan sesquioleate (ARLACEL 83) are mixed under agitation. Further, 30 g of methacryloyloxyethyltrimethylammonium chloride is dissolved in 30 g of distilled water, then this solution is added to the mixture of cyclohexane and surfactants. The microemulsion thus obtained, in which 0.3% by weight of azobisisobutyronitrile relative to the monomer is introduced, is degassed for 30 minutes at 20° C. under nitrogen atmosphere to eliminate the oxygen liable to act insofar as an inhibitor.

The microemulsion is then irradiated under ultraviolet within a 500 ml reactor thermostatically controlled at 20° C. After an hour of polymerization, a clear microlatex is obtained having a limit viscosity (with a zero shearing gradient) of 6 centipoises, exhibiting a volume fraction of the dispersed phase equal to 37%, exhibiting a molecular weight of the polymer equal to $4.8 \cdot 10^6$ and a polydispersity index (such as defined above) equal to 1.1.

EXAMPLE 2

The operating process of Example 1 is reproduced by modifying only the amounts of the ingredients as follows:

cyclohexane: 59.3 g
surfactants: 31.9 g
distilled water: 49.4 g
methacryloyloxyethyltrimethylammonium chloride: 59.4 g.

After 45 minutes of polymerization, a microlatex in the form of a clear gel is obtained.

EXAMPLE 3

65.4 g of an isoparaffin cut $C_{13}$–$C_{14}$ marketed by ESSO CHIMIE under the name ISOPAR M and 56.1 g of a mixture (having an HLB of 8.7) of surfactants TWEEN 80 and ARLACEL 83 are mixed under agitation. Further, 9.8 g of methacryloyloxyethyltrimethylammonium chloride and 29.1 g of acrylamide are dissolved in 39.5 g of distilled water, then this solution is added to the mixture of the oil phase and the surfactants. After having introduced 0.12 g of azobisisobutyronitrile in the microemulsion obtained [several words illegible] of a thermostatically-controlled 500 ml reactor, while maintaining a nitrogen stream. A microlatex in the form of a clear fluid is obtained.

EXAMPLE 4

The operating process of Example 1 is reproduced by modifying only the amounts of the ingredients as follows:
cyclohexane: 94 g
surfactants: 26 g
distilled water: 40 g
methacryloyloxyethyltrimethylammonium chloride: 40 g and by adding to the microemulsion 0.08 g of methylene bisacrylamide (crosslinking agent). The microlatex thus obtained is then treated in a way known in the art to recover the crosslinked cationic polymer. The latter is then dried in a ventilated oven at 60° C. for 24 hours then under partial vacuum (0.13 bar) at 30° C. After grinding into powder form, it is subjected to the following test:

Test for absorption and water retention capability

Pure water is added gradually to the polymer until saturation. The weight of absorbed water to reach saturation is then measured. The latter is equal here to 15 times the polymer weight.

EXAMPLE 5

The operating process of Example 1 is reproduced by modifying the amounts of the ingredients as follows:
cyclohexane: 75 g
surfactants: 25 g
distilled water: 50 g
methacryloyloxyethyltrimethylammonium chloride: 50 g.

After polymerization, a transparent microlatex is obtained having a limit viscosity (with a zero shearing gradient) of 150 centipoises, exhibiting a volume fraction of the dispersed phase equal to 54%, presenting a molecular weight of the polymer (average by weight) equal to $12.4 \cdot 10^6$ and a polydispersity index equal to 1.1.

EXAMPLE 6

The operating process of Example 1 is reproduced by modifying the amounts of the ingredients as follows:
isoparaffin cut ISOPAR M: 87 g
surfactants: 26 g
distilled water: 43.5 g
acryloyloxyethyltrimethylammonium chloride: 43.5 g.

After polymerization, an optically transparent and thermodynamically stable microlatex is obtained.

We claim:

1. A thermodynamically stable and optically transparent invert microlatex of at least one polymerized cationic water-soluble vinyl monomer exhibiting a molecular weight of the polymer between $2 \cdot 10^6$ and $15 \cdot 10^6$, and a polydispersity index between 1.05 and 1.2, wherein the cationic water soluble monomer is an unsaturated quaternary ammonium salt of the general formula:

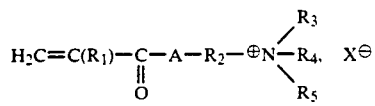

in which:

A is an oxygen atom or an NH group,
$R_1$ is a hydrogen atom or a methyl radical,
$R_2$ is a linear or branched alkyl radical having 2 to 4 carbon atoms,
$R_3$, $R_4$ and $R_5$, identical or different, are linear or branched alkyl radicals, or aryls, and
X is chosen from halogen atoms and groups $-C_2H_5-SO_4$ and $-CH_3-SO_4$.

2. A process for preparing an invert microlatex according to claim 1, comprising a first stage (a) of preparation of an invert microemulsion (of the water-in-oil type) and a second stage (b) in which the invert microemulsion obtained in stage (a) is subjected to polymerization comprising mixing the following components:

(A) an aqueous solution of at least one cationic water-soluble vinyl monomer, if necessary mixed with at least one anionic or nonionic water-soluble vinyl monomer, (B) an oil phase comprising at least one liquid hydrocarbon, and (C) at least one nonionic surfactant, in a sufficient proportion to obtain an invert microemulsion, and having an HLB:

either between 11 and 15 when the cationic water-soluble vinyl monomer is alone or mixed with an anionic water-soluble vinyl monomer, or between 7.5 and 13 when the cationic water-soluble vinyl monomer is mixed with a nonionic water-soluble vinyl monomer, wherein the cationic water-soluble monomer is an unsaturated quaternary ammonium salt of the formula

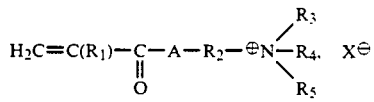

in which

A is an oxygen atom or an NH group,
$R_1$ is a hydrogen atom or a methyl radical,
$R_2$ is a linear or branched alkyl radical having 2 to 4 carbon atoms,
$R_3$, $R_4$ and $R_5$, identical or different, are linear or branched alkyl radicals, or aryls, and
X is chosen from halogen atoms and groups $-C_2H_5-SO_4$ and $-CH_3-SO_4$.

3. A process according to claim 2, wherein the concentration of the cationic water-soluble vinyl monomer in aqueous solution (A) is between 5 and 80% by weight.

4. A process according to claim 2, wherein the liquid hydrocarbon present in oil phase (B) is chosen from aliphatic, linear, branched or cyclic hydrocarbons, having 6 to 14 carbon atoms, or else from aromatic hydrocarbons having 6 to 15 carbon atoms.

5. A process according to claim 2, wherein for 100 parts by weight of the invert microemulsion, there are mixed:
25 to 65 parts by weight of aqueous solution (A),
25 to 60 parts by weight of oil phase (B), and
10 to 27 parts by weight of nonionic surfactant (C).

6. A process according to claim 2, further comprising an anionic water-soluble vinyl monomer chosen from acrylic acid, methacrylic acid, 2-acrylamido-2-methylpropanesulfonic acid and their alkaline salts.

7. A process according to claim 2, further comprising an nonionic water-soluble vinyl monomer chosen from acrylamide, methacrylamide and N-vinylpyrrolidone.

8. Process according to claim 2, wherein at least one crosslinking agent is incorporated in the invert microemulsion prepared in stage (a) in a sufficient amount relative to the sum of the monomers to be polymerized during stage (b).

9. Process according to claim 8, wherein the proportion of the crosslinking agent relative to the monomer or monomers to be polymerized during stage (b) is between 0.2 and 5% by weight.

10. A process according to claim 8, further comprising drying resultant cross-linked polymer.

11. A product as produced by the process of claim 10.

12. An invert microlatex according to claim 1, wherein the cationic water-soluble monomer is methacryloyloxyethyltrimethylammonium chloride or acryloyloxyethyltrimethylammonium chloride.

13. A process according to claim 2, wherein the cationic water-soluble monomer is methacryloyloxyethyltrimethylammonium chloride or acryloyloxyethyltrimethylammonium chloride.

14. A process according to claim 8, wherein the cationic water-soluble monomer is methacryloyloxyethyltrimethylammonium chloride or acryloyloxyethyltrimethylammonium chloride and wherein the at least one crosslinking agent is methylene bisacrylamide.

15. A process according to claim 14, further comprising drying resultant crosslinked polymer.

16. A product as produced by the process of claim 15.

17. An invert microlatex according to claim 1, exhibiting a Newtonian rheological property to dispersed phase volume fractions, reaching about 55%; and exhibiting a limit viscosity with a zero shearing gradient, determined at 25° C., between about 3 and 500 centipoises, according to the volume fraction of the dispersed phase.

* * * * *